(12) United States Patent
Lohmiller

(10) Patent No.: US 6,542,797 B2
(45) Date of Patent: Apr. 1, 2003

(54) VEHICLE CONTROL SYSTEM AND ASSOCIATED METHODS FOR CONTINUOUS PATH CONTROL OF THE VEHICLE TAKING INTO CONSIDERATION CROSS CURRENTS THAT INFLUENCE THE VEHICLE TRAJECTORY

(75) Inventor: Winfried Lohmiller, München (DE)

(73) Assignee: Eads Deutschland GmbH, Munich (DE)

( * ) Notice: Subject to any disclaimer, the term of this patent is extended or adjusted under 35 U.S.C. 154(b) by 0 days.

(21) Appl. No.: 09/883,840

(22) Filed: Jun. 18, 2001

(65) Prior Publication Data

US 2002/0007232 A1 Jan. 17, 2002

(30) Foreign Application Priority Data

Jun. 17, 2000 (DE) .......................... 100 30 036

(51) Int. Cl.⁷ ................................................. G05D 1/12
(52) U.S. Cl. ........................................... 701/3; 701/205
(58) Field of Search .................... 701/3, 4, 10, 205; 244/152, 195

(56) References Cited

U.S. PATENT DOCUMENTS 5,828,571 A * 10/1998 Bessacini et al. .......... 244/3.11
5,925,079 A * 7/1999 Peyrucain et al. .......... 244/175
6,416,019 B1 * 7/2002 Hilliard et al. ......... 244/138 R

* cited by examiner

*Primary Examiner*—Michael J. Zanelli
(74) *Attorney, Agent, or Firm*—Ladas & Parry

(57) ABSTRACT

A method for generating a path trajectory of a vehicle, taking into consideration cross currents influencing the vehicle path, which is based on a starting point, a path point as a target point, the relevant vehicle properties, as well as a current field influencing the path of vehicle. A current trajectory is formed as an integral of time over a current vector, wherein the time is the travel time, so that each point on the current trajectory corresponds to a time point, over which the vehicle path control at any time point can be related to a corresponding point on the current trajectory, and wherein the direction of the instantaneous actual position with respect to the instantaneous current point is used as a theoretical quantity for each control time point. A continuous path control system for conducting the method is provided.

6 Claims, 2 Drawing Sheets

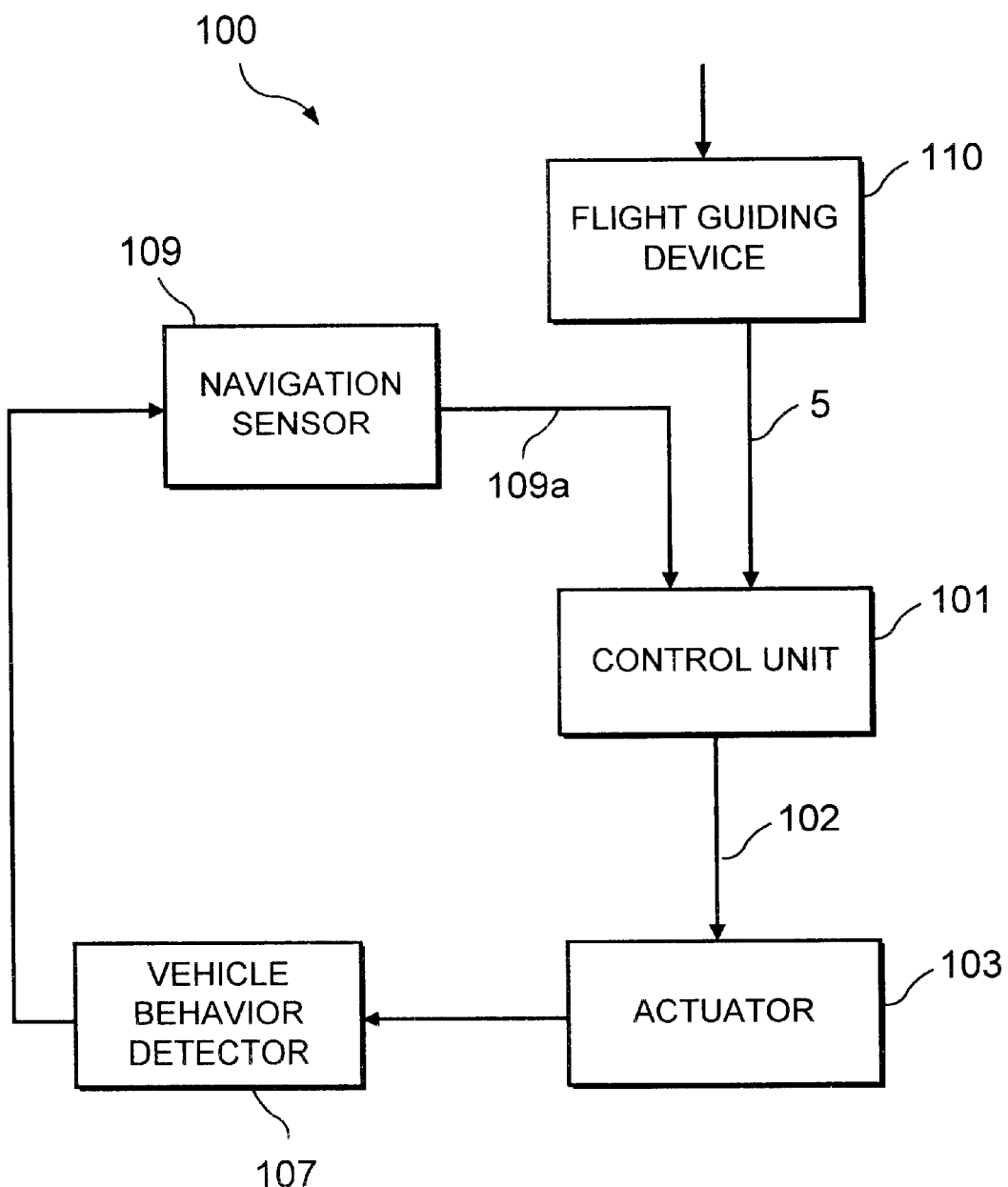
F I G. 3

VEHICLE CONTROL SYSTEM AND ASSOCIATED METHODS FOR CONTINUOUS PATH CONTROL OF THE VEHICLE TAKING INTO CONSIDERATION CROSS CURRENTS THAT INFLUENCE THE VEHICLE TRAJECTORY

BACKGROUND OF THE INVENTION

The invention relates to a vehicle control system for continuous path control of the taking into consideration cross currents that influence the vehicle trajectory.

The invention further relates to a method for generating a path trajectory for a vehicle an airplane, a parachute or a ship, whose path can be influenced by cross currents of wind or water.

Methods are known in the art, in which the flight path to be controlled is determined on the basis of a theoretical flight path established prior to the flight as well as actual positions of the vehicle determined at different time intervals and the deviations that arise thereat due to the effect of disturbances by wind or water. Based on the deviation, the vehicle will then be automatically or manually controlled to return to the theoretical path. Generally, the disruptive influences are removed, for example, by an increased flying velocity instead of utilizing these influences, for example, to maximize the range, reduce the flying time or minimize energy consumption.

In addition, the use of correction controls for large path deviations leads to a relatively high energy expenditure.

SUMMARY OF THE INVENTION

An object of the invention is to provide a system for determining a theoretical flight path that minimizes energy consumption, and in particular, optimally utilizes the prevailing cross currents.

In accordance with the invention, a method is provided for generating a path trajectory of a vehicle taking into consideration cross currents that influence the vehicle, based on a starting point and a target point of the vehicle, relevant vehicle properties, and a current field influencing the path of the vehicle. The method comprises proceeding from the target point, forming a current trajectory as an integral of time of a current vector, so that points on the current trajectory correspond to a time point over which continuous path control for any time point can be related to a corresponding point on the current trajectory and utilizing the direction of the instantaneous actual position of the vehicle to the instantaneous current point as a theoretical quantity for each time point for the control of the vehicle.

BRIEF DESCRIPTION OF THE DRAWINGS

FIG. 3 is a block diagram of a continuous path control system according to the invention.

DETAILED DESCRIPTION OF THE INVENTION

Figure 1:
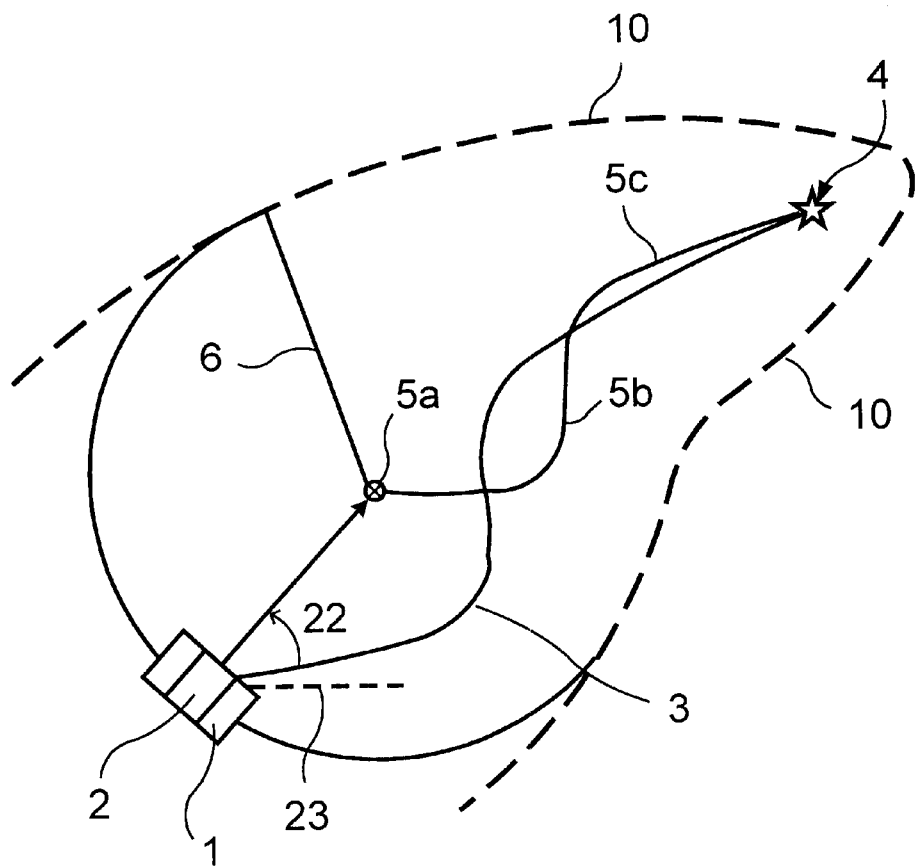
FIG. 1 diagrammatically illustrates a path trajectory for a parachute within a positional cone, generated according to the invention.
Figure 2:
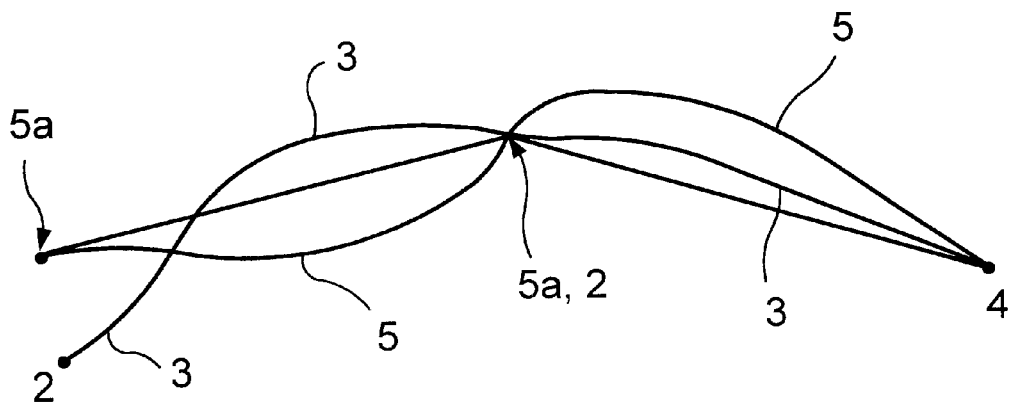
FIG. 2 diagrammatically illustrates the trajectory as shown in FIG. 1 for an airplane or a ship.

The control system according to the invention controls a vehicle 1, which can be, for example, an airplane, a ship or a parachute, from a starting point 2 through a path trajectory 3 to a target point 4.

A current trajectory 5 with a first reference point or first current point 5a and additional current points 5b, 5c serves as the reference line or as reference quantities for determining the control of the vehicle according to the invention. The current trajectory corresponds to the fraction of the theoretical trajectory 3, which is based on the transport effect alone of the cross currents surrounding the vehicle. The rest of the theoretical trajectory must be obtained from the vehicle by means of its movement based on the control according to the invention to compensate for the surrounding currents. This remaining part of trajectory 3 of vehicle 1 may be determined from the actual control measures according to the invention or as determined in an off-line simulation prior to the flight. In the latter case, the path trajectory 3 can then be used as the theoretical trajectory during travel, to which the path control of the vehicle can be advantageously obtained by methods known in the art.

The current trajectory 5 is obtained from prevailing conditions or from a current profile.

Thus known is the two-dimensional or three-dimensional vectorial current field vw (position, altitude, t) in the region of the trajectories that are considered, for example, as data depending on position, altitude and time. Each of these fundamental quantities, however may also be limited in availability in which case the control according to the invention is also limited. The current trajectory is determined from target point 4 from position (t) or altitude (t) by means of the wind velocity vector, by integration of a roughly assumed, calculated or predetermined positional and altitude trajectory. Each current point 5a, 5b, 5c thus can be assigned to the remaining time t until the target point is reached by means of the integral:

∫t vw(position(t), altitude (t) dt.

For example, for a parachute, the altitude is a pure function of time and an established starting altitude at starting point 2 based on the technical properties of the parachute, such as its descent velocity. In general, the altitude and also the position of the vehicle can be given approximately in advance, dependent on time, for example, in the form of an aircraft path or a rough manual preliminary calculation. These quantities can change constantly, particularly over time, which can usually be assumed in the case of the parachute. For parachutes, the current field, i.e., the wind field, can be given in advance advantageously only dependent on altitude in most applications, since position-dependent changes of the wind can be neglected, particularly in the case of relatively small ranges of the parachute. Since the altitude of the parachute is dependent on time, the effect of the wind can be represented as a time-dependent influence on the parachute. For a parachute, the current trajectory 5 is determined from the wind current, which prevails at the respective altitude, corresponding to the altitude course of the parachute path as a function of time. The current trajectory then results, viewed from the target point 4, by the integral of the velocity vector of the wind with respect to the altitude up to the first current point 5a, whereby the altitude course corresponding to the glide of the parachute over time serves as the basis.

Thus a time point t can be assigned to any point on the current trajectory 5. The current trajectory 5 can be determined discretely or as a continuous course.

The region for which the current field must be known is determined by a position cone 10, which indicates the limits for the sites of possible positions of the vehicle considered each time, which can reach the target point, and which can be determined according to the type of movement of the vehicle. For a parachute, this results from the range 6 of the parachute to any point of the current trajectory 5. For example, the range of a parachute can be determined from its instantaneous altitude, the glide angle and the descent velocity of the parachute. The maximum distance 6 from reference point 5 to any possible parachute position can be determined from the travel or flying time. The distance 6 corresponds to the distance that the vehicle travels within the time specification with the pregiven performance properties of the vehicle relative to the currents surrounding the vehicle. For the first reference point 5a and the maximum distance that can be traveled, a circular disk is generated around reference point 5a. Any vehicle which is found in this circular disk can reach the target point. The envelope of all circular disks around all current points, for which the points 5a, 5b, 5c in FIG. 1 are plotted, for example, forms the position cone 10, in which a vehicle must be found, in order to be able to reach the target point.

According to the invention, the optimal continuous path control of the vehicle results, due to the fact that the latter at any point on its path, for example, proceeding from starting point 2, is steered toward that point on current trajectory 5, which corresponds to the same movement-time point. The respective point 5a, 5b, 5c on current trajectory 5 is determined by the time remaining until target point 4 is reached. If the vehicle is found on the surface of cone 10, then it can still reach the target point directly. If the vehicle is found within cone 10, then the current trajectory is reached prematurely, so that energy reserves of the vehicle, which are no longer necessary for further flight, are spared. In this way, an energy estimate can be made for the entire distance traveled.

Taken individually, the instantaneous control provision of vehicle 1 according to the invention at the respective point of path trajectory 3 can be described by a theoretical azimuth angle 22, which is the angle between the line connecting starting point 2 and the first current point 5a and a stationary ground angular reference line 23, which is, for example, the equator, for the starting point 2 or actual position of vehicle 1. A theoretical quantity, which is mathematically equivalent to the theoretical azimuth angle 22, can be used for the continuous path control. The theoretical parameter used will be designated below as the theoretical azimuth angle. In general, the direction of the instantaneous actual position, e.g., position 2, to the instantaneous current point, e.g., point 5a, is to be used as the theoretical quantity for each control time point.

This control measure is repeatedly carried out for each control time point. At the respective path point, the theoretical azimuth angle 22 related to it is determined as the control measure of the respective actual position of vehicle 1 with reference to the point corresponding in time on current trajectory 5.

The continuous path control according to the invention is produced in a similar way for a vehicle or a ship, which has traveled a predetermined distance each time interval and its path is influenced by wind or water currents, referred to simply as "current" hereafter.

Therefore, the route of the airplane or ship is given roughly in advance or determined in two-dimensional or three-dimensional form, along the movement of the vehicle on this path over time. In the region of the route and within the permitted deviations from the route, which form the position cone 10, a current field is known and is provided beforehand in the form of a suitable data set.

A current vector is known for each point along the predetermined route, which is based on the current field, which is to be prepared in suitable form. Based on the assumed time lapse, thus the velocity of the vehicle as a function of the site, a current trajectory 5 results from the integral of the current vectors over distance. The current trajectory is thus formed from the difference of the original route by the fraction of the movement of the vehicle due to the surrounding current.

Each point of the current trajectory corresponds with respect to time to a point on path trajectory 3. The control according to the invention is again to be provided such that the vehicle is controlled at each point on its path trajectory 3 at the corresponding point of the current trajectory, i.e., controlled at the respective theoretical path azimuth angle 22.

The initial route may also be derived from a prior iteration or another type of approximation of a path or route.

The target point can also be an arbitrary path point. If specific spaces, or fields must not be traversed, for example, if obstacles are present in these regions, for example, the marginal points of these regions can be selected as a target point or path point, in order thereby to avoid any travel or flight through these regions.

The method according to the invention is achieved by the following steps:

A suitable current field is determined and made available in a first step. This encompasses the region in which the path trajectory is found whereby this region can refer also only to parts of the path trajectory, so that the invention can be applied only to segments of the vehicle movement. This can be generated in the form of a data set or by estimating, for example, from a weather map by means of suitable mathematical assumptions. The mathematical form of the current field depends on the type of vehicle and the accuracy to be attained. The optimal continuous path control according to the invention for a ship is undertaken with a two-dimensional vector field of the water current. For optimizing the flight path of an airplane with variable flying altitudes, preferably a three-dimensional current is to be established for the method of the invention. For a parachute, in which a constant descent velocity can be assumed and the traveled distance is small in comparison to changes in current, normally a one-dimensional current field is sufficient, i.e., a wind profile for the relevant flying altitudes.

In a subsequent step, proceeding from a target point, a current trajectory 5 is formed as the integral of time over the current vector, whereby the travel time or flight time is the prominent time. Thus each point 5a, 5b, 5c on current trajectory 5 corresponds to a time point over which the continuous path control for each time point of the control can be related to a corresponding point on current trajectory 5. The target point is generally a path point, so that an optimal continuous path control according to the invention can also be conducted for a sequence of path points.

The current trajectory 5 must not be the first trajectory. The latter may be a tentative trajectory, which has been determined in an iteration process, for example, based on a path trajectory 3, which may also be determined tentatively. The current trajectory can be generated again after formation of a path trajectory, if the prominent current vectors are changed in such a case. The current trajectory and thus also the path trajectory can thus be determined iteratively.

According to the invention, the path trajectory 3 according to the invention is determined for a vehicle 1 moving out from a starting point 2. Starting point 2 results directly from the aimed-at vehicle movement or mission and must be selected such that the vehicle can reach the target point in a pregiven time. According to the invention, a continuous or discrete determination is conducted from the current theoretical azimuth angle.

The path trajectory 3 can be produced directly as the actual path of vehicle 1 based on the control measures according to the invention, as the actual path trajectory. The path trajectory, however, may also be generated in the form of a theoretical path, which is present, for example, in the form of a data set as such, whereby vehicle 1, for example, moves in that direction by means of a coupling path. Vehicle 1 may follow such a theoretical path by means of a path sequence control.

Since disruptive factors can act on vehicle 1 at any point in time, path trajectory 3 can be newly determined with travel time. This also applies to an already formed theoretical path trajectory.

A path control system 100 according to the invention is illustrated in FIG. 3 and comprises a control unit 101, which converts the respective theoretical path quantities into theoretical quantities or commands 102 for the corresponding actuator 103 for control of vehicle 1. The theoretical path quantities may be the respective theoretical azimuth angle 22 or equivalent quantities. Based on the vehicle behavior symbolized by the functional block 107, which is based on the vehicle properties as well as the current that influences the vehicle, a positional change of vehicle 1 results, which is detected by an appropriate navigation sensor mechanism 109. The latter feeds the instantaneous actual position 109a to control unit 101 optionally by means of other functions. Control unit 101 determines the theoretical quantity 102 based on the current trajectory from a flight guiding device 110, particularly on the basis of the respective relevant points 5a, 5b, 5c of the current trajectory according to the described method, and the actual position 109a.

The continuous path control system 100 can be configured also in such a way that a theoretical path trajectory is generated in control unit 101, in flight guiding device 110 or in another device based on the method according to the invention, and this follows vehicle 1 then by a path controller known in the art.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. A method for generating a path trajectory of a vehicle taking into consideration cross currents that influence the vehicle, based on an instantaneous actual position and a target point of the vehicle, relevant vehicle properties, and a current field influencing the path of the vehicle, said method comprising:

proceeding from the target point forming a current trajectory as an integral of time of the a current vector, so that points on the current trajectory correspond to a time point, over which continuous path control for any time point can be related to a corresponding point on the current trajectory, and utilizing the direction of the instantaneous actual position of the vehicle to the according instantaneous current point as a theoretical quantity for each time point for the control of the vehicle.

2. The method for generating a path trajectory of a vehicle according to claim 1, wherein the path trajectory is newly determined with travel time.

3. The method for generating a path trajectory of a vehicle according to claim 1, wherein the current trajectory or path trajectory is determined iteratively.

4. The method for generating a path trajectory of a vehicle according to claim 1, wherein the path trajectory is determined as the theoretical path, and the actual path trajectory of the vehicle results from a path sequence control.

5. A continuous path control system comprising a control unit for conducting the method according to claim 1, comprising a navigation sensor to detect positional change of the vehicle to determine respective theoretical path quantities based on the instantaneous actual position and the relevant points of the current trajectory and to feed the theoretical path quantities in the form of commands to an actuator for the control of the vehicle.

6. The method for generating a path trajectory of a vehicle according to claim 1, wherein the vehicle is a parachute having an assumed constant or time dependent descent velocity and the points on the current trajectory correspond to respective altitude positions of the parachute.

* * * * *